(12) United States Patent
Izawa et al.

(10) Patent No.: US 11,635,652 B2
(45) Date of Patent: Apr. 25, 2023

(54) OPTICAL SUBSTRATE, ELECTRO-OPTICAL DEVICE, ELECTRONIC APPARATUS, AND METHOD FOR MANUFACTURING OPTICAL SUBSTRATE

(71) Applicant: SEIKO EPSON CORPORATION, Tokyo (JP)

(72) Inventors: Shotaro Izawa, Nagoya (JP); Satoshi Ito, Higashihiroshima (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/230,292

(22) Filed: Apr. 14, 2021

(65) Prior Publication Data

US 2021/0325725 A1 Oct. 21, 2021

(30) Foreign Application Priority Data

Apr. 15, 2020 (JP) .............................. JP2020-072699

(51) Int. Cl.
*G02F 1/1335* (2006.01)
(52) U.S. Cl.
CPC .............................. *G02F 1/133526* (2013.01)
(58) Field of Classification Search
None
See application file for complete search history.

(56) References Cited

U.S. PATENT DOCUMENTS

| | | | | |
|---|---|---|---|---|
| 2015/0270404 A1* | 9/2015 | Sato | ................ | H01L 21/02551 349/46 |
| 2015/0277187 A1* | 10/2015 | Akasaka | .............. | H04N 9/3152 349/57 |
| 2015/0355502 A1* | 12/2015 | Ozawa | ................ | G02B 3/0012 349/57 |
| 2019/0064584 A1* | 2/2019 | Ito | ..................... | G02F 1/134309 |
| 2021/0063812 A1* | 3/2021 | Ito | ..................... | G02F 1/133526 |

FOREIGN PATENT DOCUMENTS

| | | |
|---|---|---|
| JP | H07-106537 B2 | 11/1995 |
| JP | 2006-78782 A | 3/2006 |
| JP | 2019-040153 A | 3/2019 |

* cited by examiner

*Primary Examiner* — Thanh P Nguyen (74) *Attorney, Agent, or Firm* — Oliff PLC (57) ABSTRACT

An optical substrate includes a first substrate, a light-transmitting layer disposed at the first substrate, concave portions provided in the light-transmitting layer, and a lens layer disposed so as to fill the concave portions. The light-transmitting layer is constituted by a plurality of light-transmitting layers, and an edge of the concave portion is in contact with an edge of an adjacent concave portion adjacent to the concave portion.

10 Claims, 11 Drawing Sheets

OPTICAL SUBSTRATE, ELECTRO-OPTICAL DEVICE, ELECTRONIC APPARATUS, AND METHOD FOR MANUFACTURING OPTICAL SUBSTRATE

The present application is based on, and claims priority from JP Application Serial Number 2020-072699, filed Apr. 15, 2020, the disclosure of which is hereby incorporated by reference herein in its entirety.

BACKGROUND

1. Technical Field

The present disclosure relates to an optical substrate, an electro-optical device, an electronic apparatus, and a method for manufacturing an optical substrate.

2. Related Art

As an electro-optical device, an active drive type liquid crystal device including a switching element in a pixel is known. Such a liquid crystal device is used, for example, as a light valve of a projector that is an electronic apparatus.

In the liquid crystal device, a plurality of micro-lenses are provided in order to suppress loss of light. For example, in JP-A-2019-40153, a liquid crystal device is disclosed that includes pixel electrodes disposed on a substrate, a wiring layer including wiring lines disposed between the substrate and the pixel electrodes, and the like, and micro-lenses disposed between the pixel electrodes and the wiring layer.

However, with the liquid crystal device disclosed in JP-A-2019-40153, since an etching rate of a light-transmitting layer is constant in the thickness direction when forming the micro-lenses, adjustment of the shape of a lens surface is difficult, and thus, there is a problem that it is difficult to form an ideal lens surface having a high light utilization efficiency.

SUMMARY

An optical substrate includes a substrate, a light-transmitting layer disposed at the substrate, a concave portion provided in the light-transmitting layer, and a lens layer disposed filling the concave portion. The light-transmitting layer is constituted by a plurality of layered films, and an edge of the concave portion is in contact with an edge of an adjacent concave portion adjacent to the concave portion.

An optical substrate includes a substrate, a light-transmitting layer disposed at the substrate, a concave portion provided in the light-transmitting layer, and a lens layer disposed filling the concave portion. The light-transmitting layer has an etching rate varying in a continuous manner, and an edge of the concave portion is in contact with an edge of an adjacent concave portion adjacent to the concave portion.

An optical substrate includes a substrate, a light-transmitting layer disposed at the substrate, a concave portion provided in the light-transmitting layer, and a lens layer disposed filling the concave portion. The light-transmitting layer has an oxygen content varying in a continuous manner, and an edge of the concave portion is in contact with an edge of an adjacent concave portion adjacent to the concave portion.

An electro-optical device includes the above-described optical substrate, a counter substrate disposed facing the optical substrate, and an electro-optical layer disposed between the optical substrate and the counter substrate.

An electronic apparatus includes the electro-optical device described above.

A method for manufacturing an optical substrate includes forming, at a substrate, a light-transmitting layer including a plurality of layered films having mutually different etching rates, forming, at the light-transmitting layer, a mask having an opening hole, forming a concave portion by performing first etching processing on the light-transmitting layer using the mask, removing the mask at the light-transmitting layer, performing second etching processing on the light-transmitting layer so that an edge of the concave portion is in contact with an edge of an adjacent concave portion adjacent to the concave portion, and forming a lens layer filling the concave portion.

DESCRIPTION OF EXEMPLARY EMBODIMENTS

First Embodiment

Figure 1:
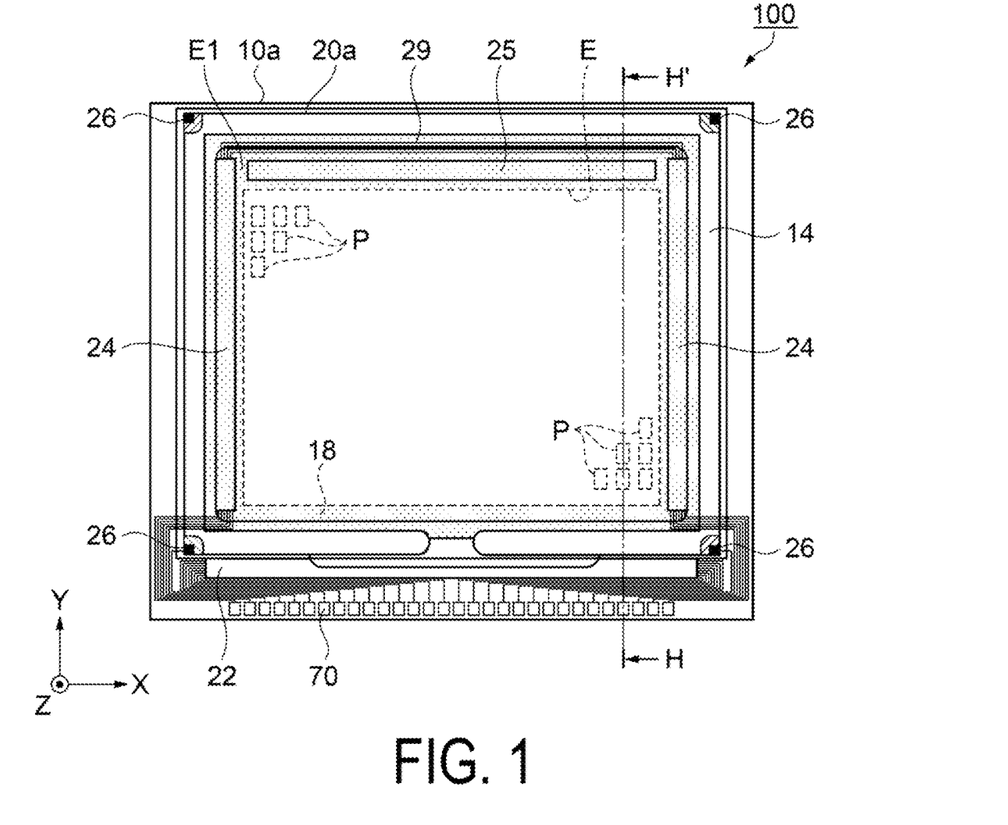
FIG. 1 is a schematic plan view illustrating a configuration of a liquid crystal device as an electro-optical device.
Figure 2:
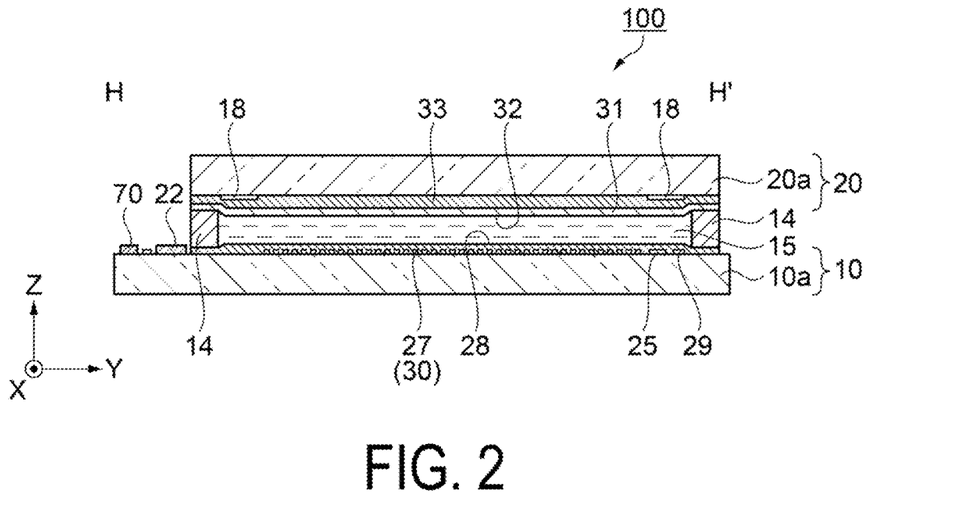
FIG. 2 is a schematic cross-sectional view taken along a line H-H' of the liquid crystal device illustrated in FIG. 1.

As illustrated in FIG. 1 and FIG. 2, a liquid crystal device 100 according to this embodiment includes an element substrate 10 and a counter substrate 20 that are disposed facing each other, and a liquid crystal layer 15, as an electro-optical layer, sandwiched between the pair of substrates. A first substrate 10a as a substrate configuring the element substrate 10 and a second substrate 20a configuring the counter substrate 20 are each formed, for example, of glass, quartz, or the like.

The element substrate 10 is larger than the counter substrate 20, and both the substrates are joined together via a seal material 14 disposed along an outer circumference of the counter substrate 20. The liquid crystal layer 15 is configured as a result of liquid crystal having a positive or negative dielectric anisotropy being encapsulated in a gap between the element substrate 10 and the counter substrate 20.

An adhesive formed of thermosetting or ultraviolet curable epoxy resin, or the like is employed as the seal material 14, for example. The seal material 14 is mixed with a spacer for keeping the gap between the pair of substrates constant, for example.

On an inner side of the seal material 14, a display region E is provided in which a plurality of pixels P that contribute to display are arrayed. Around the display region E, a peripheral region E1 is disposed in which peripheral circuits and the like that do not contribute to display are provided.

A data line drive circuit 22 is provided between the seal material 14 along a first side portion of the element substrate 10 and the first side portion. Further, an inspection circuit 25 is provided between the seal material 14 along a second side portion, which faces the first side portion, and the display region E. Furthermore, scanning line drive circuits 24 are provided between the seal material 14 along two other side portions orthogonal to the first side portion and facing each other, and the display region E. Between the seal material 14 along the second side portion, which faces the first side portion, and the inspection circuit 25, a plurality of wiring lines 29 linking the two scanning line drive circuits 24 are provided.

On the inner side of the seal material 14 disposed in a frame-like shape, a light-blocking film 18 that is also formed in a frame-like shape is provided on the counter substrate 20 side. The light-blocking film 18 is formed, for example, of a light-reflecting metal or metal compound, or the like, and the inside of the light-blocking film 18 is formed as the display region E including the plurality of pixels P. For example, tungsten silicide (WSi) can be used as the light-blocking film 18.

Wiring lines linked to those data line drive circuit 22 and scanning line drive circuits 24 are connected to a plurality of external connection terminals 70 that are arrayed along the first side portion. Hereinafter, a direction along the first side portion will be referred to as an X direction, and a direction along the other two sides orthogonal to the first side portion and facing each other will be referred to as a Y direction. Further, viewing from a Z direction will be referred to as "plan view".

As illustrated in FIG. 2, on a surface on the liquid crystal layer 15 side of the first substrate 10a, a light-reflecting pixel electrode 27, a thin film transistor (hereinafter referred to as a "transistor 30") as a switching element, and a data line (not illustrated), each of which is provided for each of the pixels P, and a first alignment film 28 covering the pixel electrode 27, the transistor 30, and the data line are formed.

The pixel electrode 27 is formed of a transparent conductive film such as an indium tin oxide (ITO) film, for example. The element substrate 10 according to the present disclosure includes at least the pixel electrode 27, the transistor 30, and the first alignment film 28.

On a surface on the liquid crystal layer 15 side of the counter substrate 20, the light-blocking film 18, an insulating layer 33 formed so as to cover the light-blocking film 18, a counter electrode 31 provided so as to cover the insulating layer 33, and a second alignment film 32 covering the counter electrode 31 are provided. The counter substrate 20 according to the present disclosure includes at least the light-blocking film 18, the counter electrode 31, and the second alignment film 32.

As illustrated in FIG. 1, the light-blocking film 18 is provided at a position overlapping with the scanning line drive circuits 24 and the inspection circuit 25 in plan view, while surrounding the display region E. As a result, the light-blocking film 18 blocks light incident from the counter substrate 20 side on the peripheral circuits including those drive circuits, and plays a role of preventing the peripheral circuits from malfunctioning due to the light. Further, the light-blocking film 18 blocks the light to prevent unnecessary stray light from being incident on the display region E, and ensures high contrast in the display of the display region E.

The insulating layer 33 is formed, for example, of an inorganic material such as silicon oxide, has optical transparency, and is provided so as to cover the light-blocking film 18. As a method for forming the insulating layer 33 described above, a film forming method using plasma chemical vapor deposition (CVD) or the like is employed, for example.

The counter electrode 31 is formed, for example, of a transparent conductive film such as an indium tin oxide (ITO) film. The counter electrode 31 covers the insulating layer 33, and is electrically connected to wiring lines on the element substrate 10 side by vertical conducting portions 26 provided at four corners of the counter substrate 20, as illustrated in FIG. 1.

The first alignment film 28 covering the pixel electrodes 27, and the second alignment film 32 covering the counter electrode 31 are selected based on an optical design of the liquid crystal device 100. The first alignment film 28 and the second alignment film 32 are each formed, for example, as an inorganic alignment film, which is obtained by forming an inorganic material such as silicon oxide ($SiO_x$) into a film using a vapor-phase growth method, and aligning liquid crystal molecules having negative dielectric anisotropy in a substantially vertical manner.

The liquid crystal device 100 described above is a transmissive liquid crystal device, and the liquid crystal device 100 adopts an optical design of a normally white mode in which the transmittance of the pixel P is greater when a voltage is not applied than when the voltage is applied, or of a normally black mode in which the transmittance of the pixel P is smaller when the voltage is not applied than when the voltage is applied. In accordance with the optical design, a polarizing element is disposed and used on each of a light incidence side and a light emission side.

Figure 3:
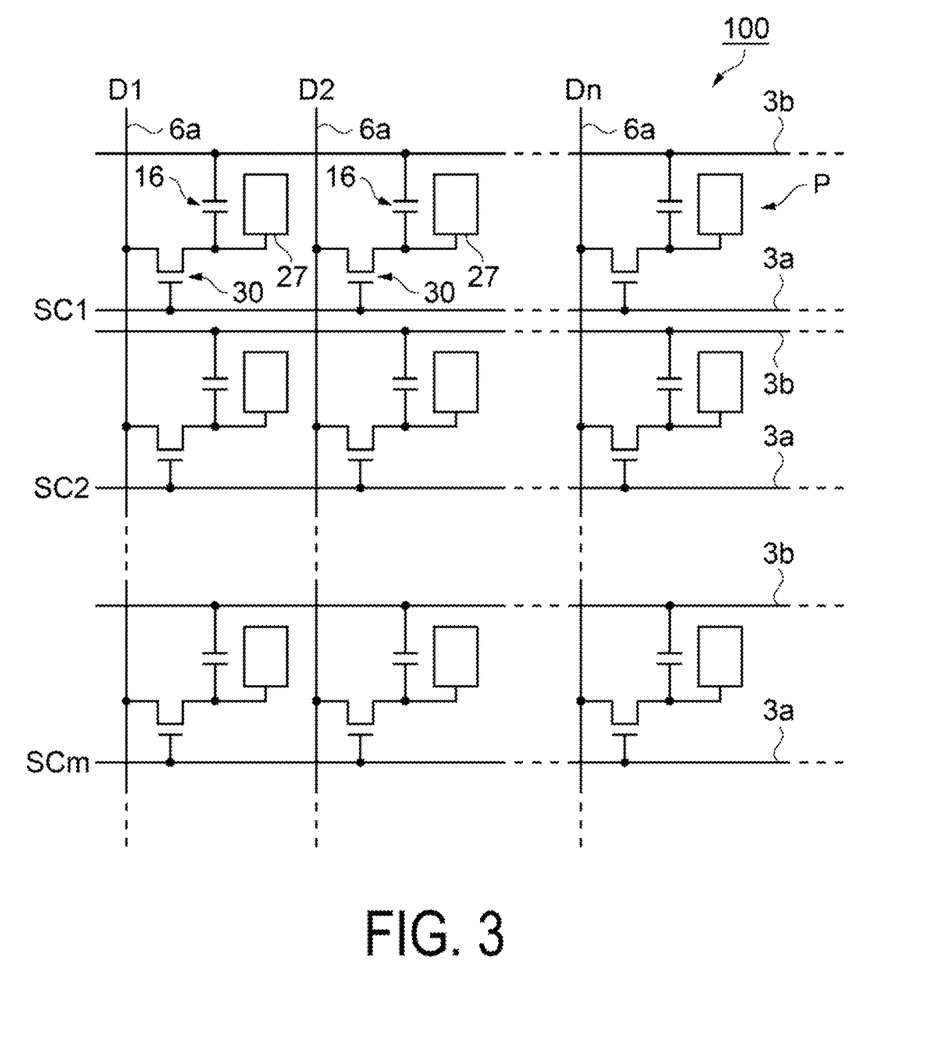
FIG. 3 is an equivalent circuit diagram illustrating an electrical configuration of the liquid crystal device.

As illustrated in FIG. 3, the liquid crystal device 100 includes a plurality of scanning lines 3a and a plurality of data lines 6a, which are insulated from one another and orthogonal to one another at least in the display region E, and capacitance lines 3b. For example, a direction in which the scanning lines 3a extend is the X direction, and a direction in which the data lines 6a extend is the Y direction.

The scanning line 3a, the data line 6a, the capacitance line 3b, and the pixel electrode 27, the transistor 30, and a capacitance element 16 that are provided in each of regions partitioned by the above-mentioned signal lines configure a pixel circuit of the pixel P.

The scanning line 3a is electrically connected to a gate of the transistor 30, and the data line 6a is electrically connected to a source region of the transistor 30. The pixel electrode 27 is electrically connected to a drain region of the transistor 30.

The data lines 6a are connected to the data line drive circuit 22 (see FIG. 1) and supply, to each of the pixels P, image signals D1, D2, . . . , and Dn supplied from the data line drive circuit 22. The scanning lines 3a are connected to the scanning line drive circuit 24 (see FIG. 1) and supply, to each of the pixels P, scanning signals SC1, SC2, . . . , and SCm supplied from the scanning line drive circuit 24.

The image signals D1 to Dn supplied from the data line drive circuit 22 to the data lines 6a may be line-sequentially supplied in this order, or may be supplied to the plurality of respective data lines 6a adjacent to each other in groups. The scanning line drive circuit 24 line-sequentially supplies the scan signals SC1 to SCm to the scanning lines 3a in a pulsed manner at predetermined timings.

The liquid crystal device 100 is configured such that each of the transistors 30 as the switching element is turned on only for a certain period in response to an input of the scanning signals SC1 to SCm, and the image signals D1 to Dn supplied from the data lines 6a are written in the pixel electrodes 27 at predetermined timings. Then, the image signals D1 to Dn of a predetermined level written into the liquid crystal layer 15 via the pixel electrodes 27 are held for a certain period between the pixel electrodes 27 and the counter electrode 31, which is disposed so as to face the pixel electrodes 27 with the liquid crystal layer 15 interposed therebetween.

To prevent leakage of the held image signals D1 to Dn, the capacitance element 16 is connected in parallel with a liquid crystal capacitor formed between the pixel electrodes 27 and the counter electrode 31. The capacitance element 16 includes a dielectric layer, as a capacitance film, between two capacitance electrodes.

Figure 4:
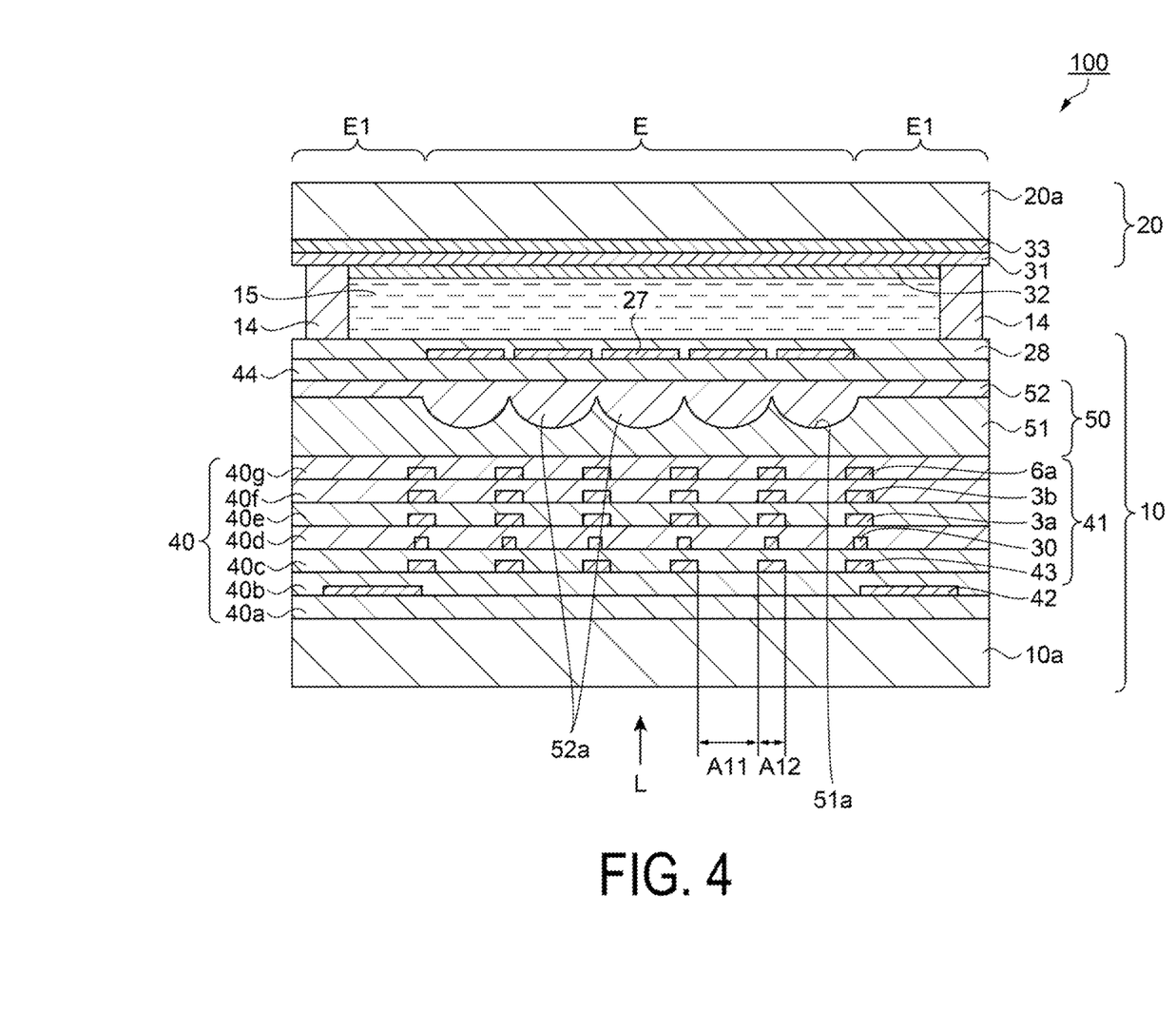
FIG. 4 is a cross-sectional view illustrating a configuration of the liquid crystal device according to a first embodiment.

As illustrated in FIG. 4, the liquid crystal device 100 is provided with the element substrate 10 as an optical substrate, and the counter substrate 20 disposed so as to face the element substrate 10. The first substrate 10a configuring the element substrate 10 is formed of quartz, for example. The element substrate 10 includes, on the first substrate 10a, an insulating layer 40, a wiring layer 41, a lens body 50 including a plurality of micro-lenses, the pixel electrodes 27, and the first alignment film 28.

The insulating layer 40 is formed of silicon oxide, for example, and includes a first insulating layer 40a, a second insulating layer 40b, a third insulating layer 40c, a fourth insulating layer 40d, a fifth insulating layer 40e, a sixth insulating layer 40f, and a seventh insulating layer 40g. Light-blocking films 42 each formed in a rectangular frame-shape in plan view are disposed between the first insulating layer 40a and the second insulating layer 40b. The wiring layer 41 includes light-blocking films 43, the transistors 30, the scanning lines 3a, the capacitance lines 3b, and the data lines 6a.

The above-described wiring layer 41 includes light-transmitting regions A11 through which light L passes, and light-blocking regions A12 which block the light L and in which the various wiring lines are disposed. The light-transmitting regions A11 each have a substantially rectangular shape in plan view, and are disposed in a matrix. The light-blocking regions A12 each have a lattice shape in plan view. In other words, the light-blocking regions A12 are disposed so as to surround the light-transmitting regions A11 in plan view.

The lens body 50 includes a light-transmitting layer 51 and a lens layer 52, and functions, for example, as a lens that adjusts a spread angle of the light L for each of the pixels P. The light-transmitting layer 51 is a transmissive layer having insulating properties, and is formed, for example, of silicon oxide ($SiO_2$). Concave portions 51a are formed in the light-transmitting layer 51, and the lens layer 52 is disposed so as to cover the concave portions 51a.

The lens layer 52 is, for example, a material having a greater refractive index than that of the light-transmitting layer 51, and is formed, for example, of silicon oxynitride (SiON). Lenses 52a in the lens layer 52 are each constituted by a convex lens that protrudes toward the light-transmitting layer 51. Further, each of the lenses 52a is formed in a hemispherical shape. The lenses 52a are disposed so as to correspond to each of the pixel electrodes 27 disposed on the lens body 50.

A light-transmitting layer 44 is disposed on the lens body 50. The light-transmitting layer 44 adjusts an optical path length of the light L that passes through the lenses 52a. The light-transmitting layer 44 is formed of silicon oxide, for example.

The pixel electrodes 27 are disposed on the light-transmitting layer 44. Each one of the pixel electrodes 27 overlaps with each one of the light-transmitting regions A11 in plan view.

On the pixel electrodes 27 and the light-transmitting layer 44, the first alignment film 28 is provided that is obtained by performing oblique vapor deposition on an inorganic material such as silicon oxide. On the first alignment film 28, the liquid crystal layer 15 is disposed in which the liquid crystal or the like is encapsulated in a space enclosed by the seal material 14.

Meanwhile, the counter substrate 20 includes the second substrate 20a. The second substrate 20a is formed of quartz, for example. The counter substrate 20 includes the insulating layer 33, the counter electrode 31, and the second alignment film 32 that are provided on the second substrate 20a (on the liquid crystal layer 15 side). The counter electrode 31 is formed, for example, of a transparent conductive film such as an ITO film. Similarly to the first alignment film 28, the second alignment film 32 is obtained by performing the oblique vapor deposition on an inorganic material such as silicon oxide, for example.

In a state in which no electric field is generated between the pixel electrodes 27 and the counter electrode 31, the liquid crystal layer 15 is in a predetermined alignment state due to the alignment films 28 and 32. The light L of a projector 1000 to be described below enters from the element substrate 10 side. Next, a structure of the lens body 50 will be described in more detail.

Figure 5:
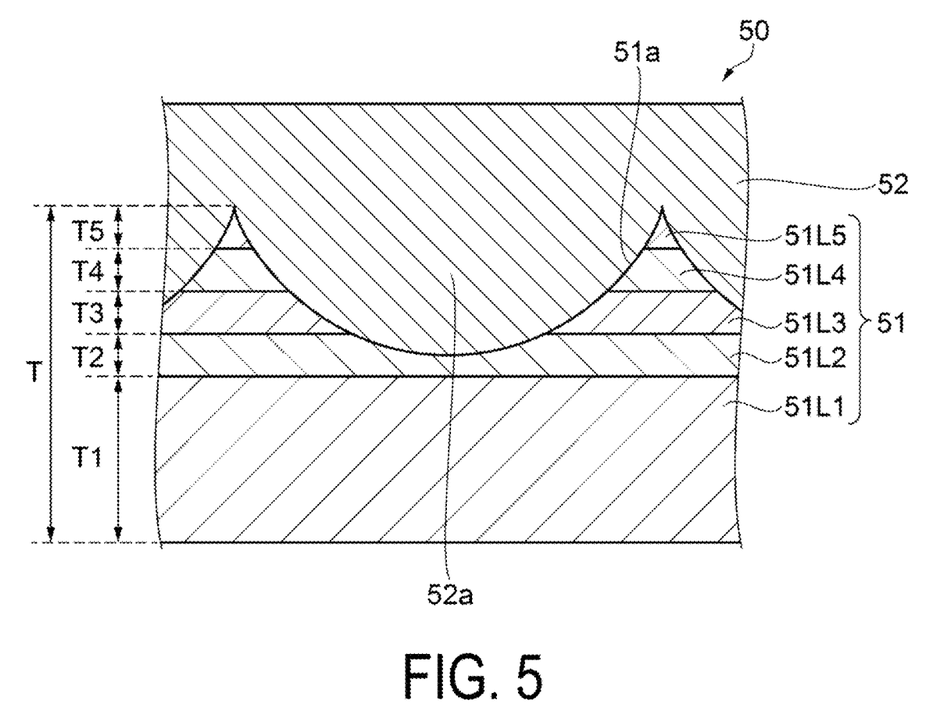
FIG. 5 is a cross-sectional view illustrating a structure of a portion of a lens body.

As illustrated in FIG. 5, the lens body 50 includes the light-transmitting layer 51 and the lens layer 52 including the lens 52a. The light-transmitting layer 51 is constituted by five layered films as a plurality of layered films, for example. Specifically, the light-transmitting layer 51 includes a first light-transmitting layer 51L1, a second light-transmitting layer 51L2, a third light-transmitting layer 51L3, a fourth light-transmitting layer 51L4, and a fifth light-transmitting layer 51L5. The concave portions 51a are provided across the second light-transmitting layer 51L2, the third light-transmitting layer 51L3, the fourth light-transmitting layer 51L4, and the fifth light-transmitting layer 51L5.

These light-transmitting layers 51L1, 51L2, 51L3, 51L4, and 51L5 have mutually different etching rates in etching processing used to form the concave portions 51a. Thus, by appropriately setting the etching rate for each of the light-transmitting layers 51L1, 51L2, 51L3, 51L4, and 51L5, it is possible to form a desired lens shape, such as a spherical shape, by the etching processing. Note that the spherical shape refers to a shape formed continuously from an end of the concave portion 51a without including any straight line. In this specification, the end of the concave portion 51a refers to a portion at which the concave portion 51a is in contact with an adjacent concave portion 51a adjacent to the concave portion 51a.

Figure 6:
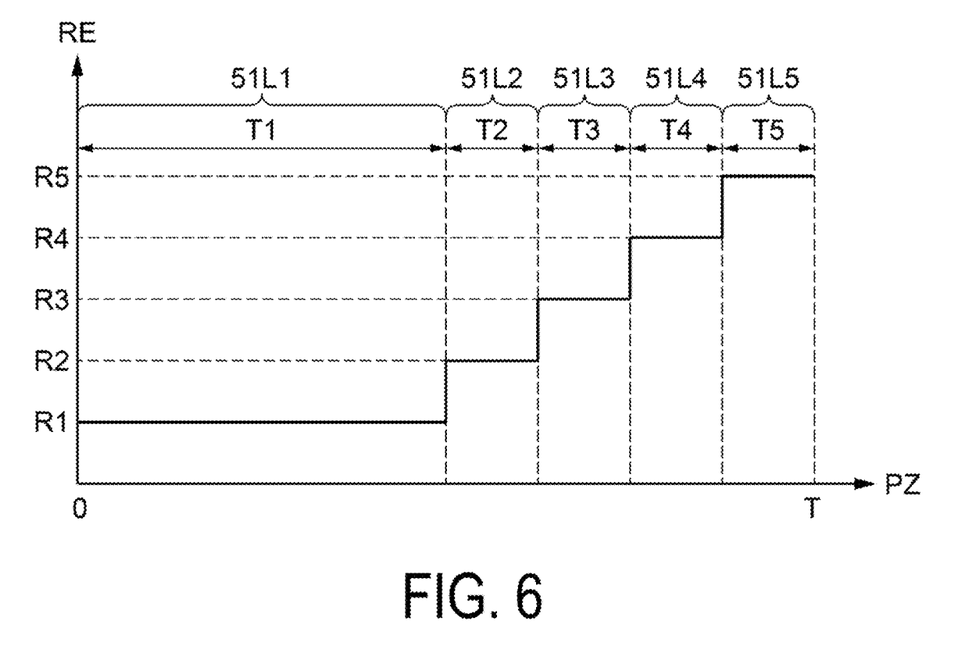
FIG. 6 is a graph showing a relationship between a position in the thickness direction of a lens and an etching rate.

A graph shown in FIG. 6 indicates a relationship between a position PZ in the thickness direction of the light-transmitting layer 51 and an etching rate RE. Note that the etching rate of the first light-transmitting layer 51L1 is denoted as R1. The etching rate of the second light-transmitting layer 51L2 is denoted as R2. The etching rate of the third light-transmitting layer 51L3 is denoted as R3. The etching rate of the fourth light-transmitting layer 51L4 is denoted as R4. The etching rate of the fifth light-transmitting layer 51L5 is denoted as R5.

A relationship between the etching rates of each of the light-transmitting layers 51L1, 51L2, 51L3, 51L4, and 51L5 is R1<R2<R3<R4<R5. However, relative ratios of the etching rates R1, R2, R3, R4, and R5 are not limited to the ratios illustrated in FIG. 6, and are appropriately set in accordance with a desired shape of the concave portion 51a.

Note that the etching rate R1 need not necessarily satisfy the above-described relationship and may be any chosen rate, since the first light-transmitting layer 51L1 is formed outside a forming region of the concave portion 51a. Further, although the etching rate in the same layer is constant in the thickness direction, the etching rate in the same layer may change in the thickness direction. For example, the etching rate in the same layer may change in a stepwise or continuous manner in the thickness direction, such that a difference between the etching rates of adjacent layers becomes small.

As long as the light-transmitting layers 51L1, 51L2, 51L3, 51L4, and 51L5 have the mutually different etching rates under the same etching conditions, a composition of constituent materials configuring each of the light-transmitting layers 51L1, 51L2, 51L3, 51L4, and 51L5 may be different from each other, but it is preferable that each of the light-transmitting layers 51L1, 51L2, 51L3, 51L4, and 51L5 have the same composition. When each of the light-transmitting layers 51L1, 51L2, 51L3, 51L4, and 51L5 is formed by the same composition, the light-transmitting layers 51L1, 51L2, 51L3, 51L4, and 51L5 can be formed continuously using the same film forming device. Further, even in this case, by varying composition ratios of the constituent materials configuring each of the light-transmitting layers 51L1, 51L2, 51L3, 51L4, and 51L5, the etching rates of these layers can be made different from each other under the same etching conditions.

More specifically, each of the light-transmitting layers 51L1, 51L2, 51L3, 51L4, and 51L5 is preferably a silicon oxide film or a silicon oxynitride film. Note that when each of these layers is the silicon oxide film or the silicon oxynitride film, the above-described etching rate is an etching rate when using dilute hydrofluoric acid.

The silicon oxide film or the silicon oxynitride film can be efficiently formed by a film forming method such as thermal oxidation or plasma CVD. Further, by causing the silicon oxide films or the silicon oxynitride films to have mutually different oxygen contents, etching rates thereof can be made mutually different. Specifically, the etching rate of the silicon oxide film or the silicon oxynitride film when using the dilute hydrofluoric acid can be reduced by increasing the oxygen content of the silicon oxide film or the silicon oxynitride film, and conversely, the etching rate can be increased by reducing the oxygen content.

Thus, when each of the plurality of light-transmitting layers 51L1, 51L2, 51L3, 51L4, and 51L5 is the silicon oxide film or the silicon oxynitride film, compared to a case in which films of another constituent material are used, it is easy to form the light-transmitting layer 51 including each of the light-transmitting layers 51L1, 51L2, 51L3, 51L4, and 51L5 having the mutually different etching rates. Furthermore, when silicon nitride is used as a constituent material of the lens layer 52, a difference in the refractive index between the lens layer 52 and the light-transmitting layer 51 can be set to a favorable level for the lens characteristics.

Therefore, when each of the light-transmitting layers 51L1, 51L2, 51L3, 51L4, and 51L5 is the silicon oxide film or the silicon oxynitride film, it is preferable that the oxygen contents in these layers be mutually different. In this case, it is easy to form the light-transmitting layer 51 including each of the light-transmitting layers 51L1, 51L2, 51L3, 51L4, and 51L5 having the mutually different etching rates.

Further, densities of each of the light-transmitting layers 51L1, 51L2, 51L3, 51L4, and 51L5 may be mutually different. In this case, even when the compositions and composition ratios of the constituent materials configuring those layers are the same as each other, the etching rates for those layers can be made mutually different. Specifically, the etching rate of the silicon oxide film or the silicon oxynitride film when using the dilute hydrofluoric acid can be reduced by increasing the density of the silicon oxide film or the silicon oxynitride film, and conversely, the etching rate can be increased by reducing the density.

In a cross-sectional view illustrated in FIG. 5, the thickness of the first light-transmitting layer 51L1 is denoted as T1. The thickness of the second light-transmitting layer 51L2 is denoted as T2. The thickness of the third light-transmitting layer 51L3 is denoted as T3. The thickness of the fourth light-transmitting layer 51L4 is denoted as T4. The thickness of the fifth light-transmitting layer 51L5 is denoted as T5.

A relationship between the thicknesses of each of the light-transmitting layers 51L1, 51L2, 51L3, 51L4, and 51L5 is T1>T2=T3=T4=T5. However, the thicknesses T2, T3, T4, and T5 may be appropriately set in accordance with the desired shape of the concave portion 51a, and may be mutually different. In combination with the above-described differences in the etching rates, the shape of the concave portion 51a can also be adjusted by causing the thicknesses T2, T3, T4, and T5 to be mutually different. Note that the thickness T1 need not necessarily satisfy the above-described relationship and may be any chosen thickness, since the first light-transmitting layer 51L1 is formed outside the forming region of the concave portion 51a.

Figure 7:
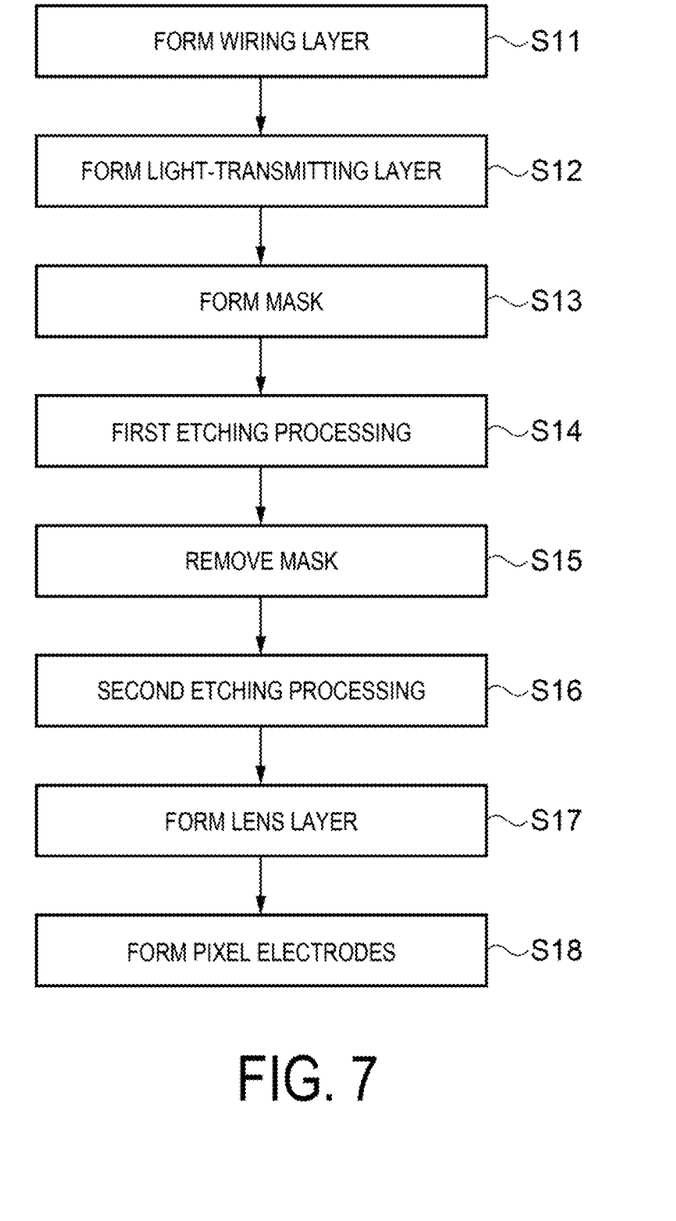
FIG. 7 is a flowchart illustrating a method for manufacturing an element substrate.

Next, a method for manufacturing the element substrate 10 will be described with reference to FIG. 7 to FIG. 13. As illustrated in FIG. 7, the wiring layer 41 is formed at step S11. Specifically, the insulating layer 40 and the wiring layer 41 are formed on the first substrate 10a, using a known film forming method and a known patterning method. The first substrate 10a is formed of quartz, for example. The insulating layer 40 is formed of silicon oxide, for example.

Figure 8:
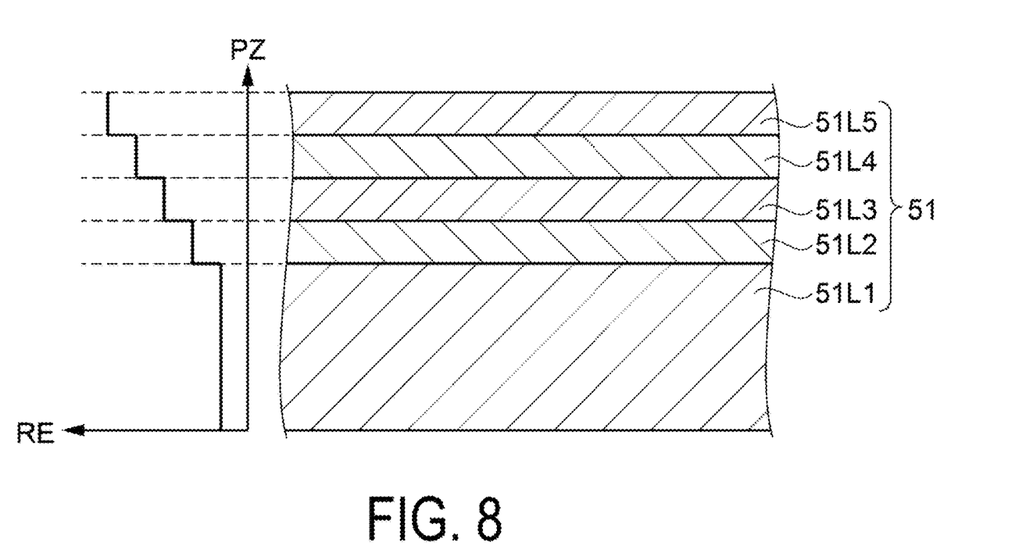
FIG. 8 is a cross-sectional view illustrating a part of a method for manufacturing the liquid crystal device.

At step S12, the light-transmitting layer 51 is formed in a layer above the wiring layer 41. Specifically, as illustrated in FIG. 4 and FIG. 8, the light-transmitting layer 51 is formed on the insulating layer 40. Note that a cross-sectional view illustrated in FIG. 8 illustrates only the light-transmitting layer 51. A vapor deposition method such as the chemical vapor deposition (CVD) method is used as a method for forming the light-transmitting layer 51, for example. The raw material gas is tetraethoxysilane (TEOS) or $SiH_4$, for example.

As illustrated in FIG. 8, the first light-transmitting layer 51L1, the second light-transmitting layer 51L2, the third light-transmitting layer 51L3, the fourth light-transmitting layer 51L4, and the fifth light-transmitting layer 51L5 are sequentially formed in this order to form the light-transmitting layer 51. As a method for manufacturing each of the light-transmitting layers 51L1, 51L2, 51L3, 51L4, and 51L5A, a ratio between the raw material gas and oxygen is changed in a stepwise manner. For example, film forming conditions such as pressure, temperature, power, or the like in a CVD device are made different for each of the layers. As a result, each of the light-transmitting layers 51L1, 51L2, 51L3, 51L4, and 51L5 whose oxygen contents, densities, or the like are mutually different is obtained.

For example, the greater the pressure, the greater the oxygen content of the layer or the lower the density of the layer. The higher the temperature, the greater the oxygen content of the layer or the lower the density of the layer. The smaller the power in the CVD device, the greater the oxygen content of the layer or the lower the density of the layer. From the above, the relationship between the above-described position PZ and the etching rate RE of each of the light-transmitting layers 51L1, 51L2, 51L3, 51L4, and 51L5 is obtained.

Figure 9:
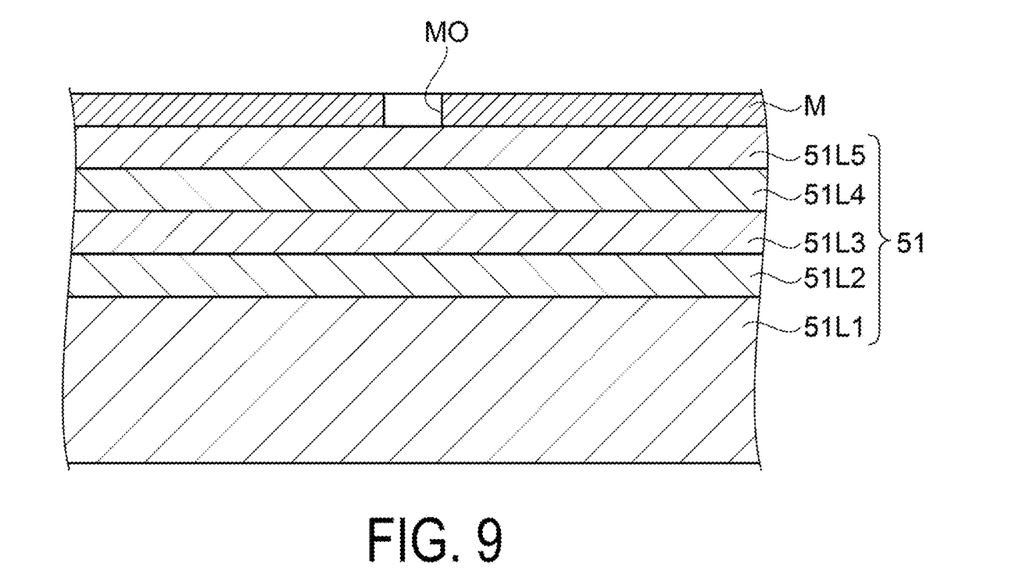
FIG. 9 is a cross-sectional view illustrating a part of the method for manufacturing the liquid crystal device.

At step S13, a mask M is formed on the light-transmitting layer 51. Specifically, as illustrated in FIG. 9, a resist material is applied onto the light-transmitting layer 51, and exposed and developed. As a result, the mask M having an opening hole MO is formed. Note that a metal film may be used as the mask M.

Figure 10:
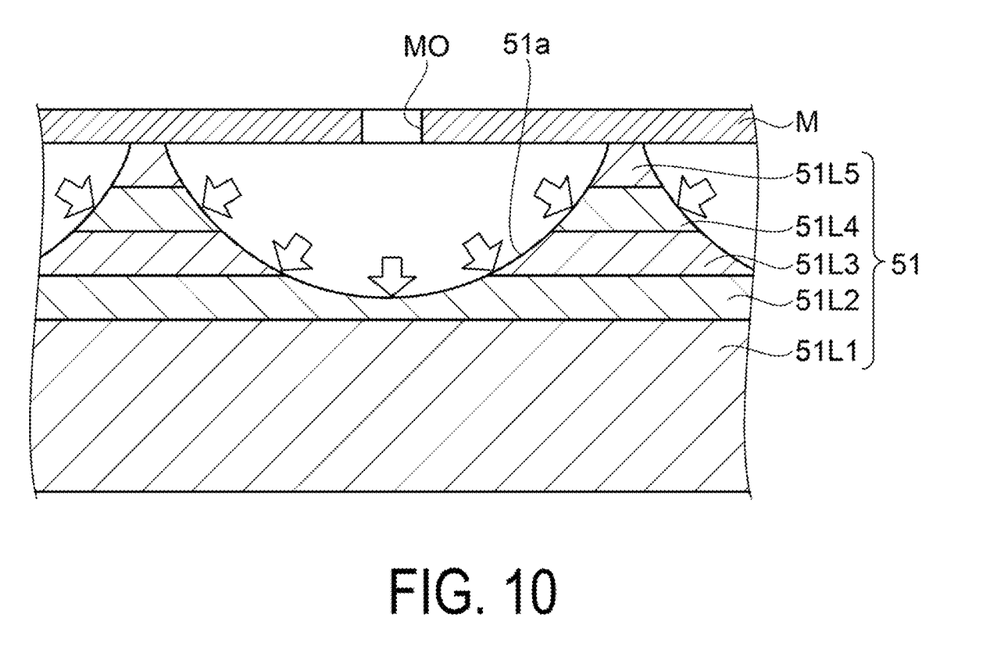
FIG. 10 is a cross-sectional view illustrating a part of the method for manufacturing the liquid crystal device.

At step S14, first etching processing is performed on the light-transmitting layer 51. Specifically, as illustrated in FIG. 10, the concave portion 51a is formed in the light-transmitting layer 51 by performing the first etching processing through the mask M. As the first etching processing, gas etching using a fluorine-based etching gas such as hydrogen fluoride (HF), or wet etching using a fluorine-based etching solution such as hydrogen fluoride (HF) is used, for example.

In this way, by appropriately setting the etching rate for each of the light-transmitting layers 51L1, 51L2, 51L3, 51L4, and 51L5, the concave portion 51a having a desired lens surface shape can be easily formed.

Figure 11:
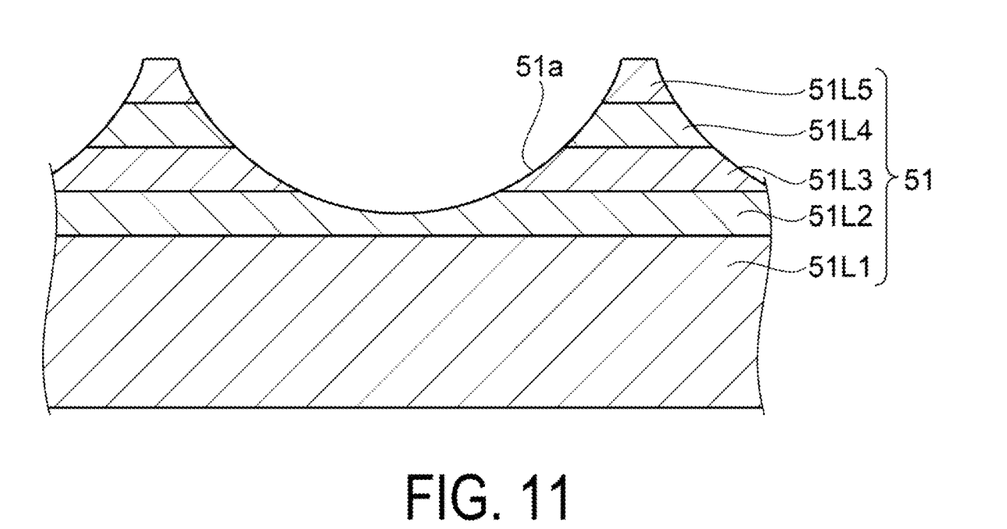
FIG. 11 is a cross-sectional view illustrating a part of the method for manufacturing the liquid crystal device.

At step S15, the mask M is removed. Specifically, as illustrated in FIG. 11, the mask M is removed by performing plasma or asking processing using ozone on the mask M, for example.

Figure 12:
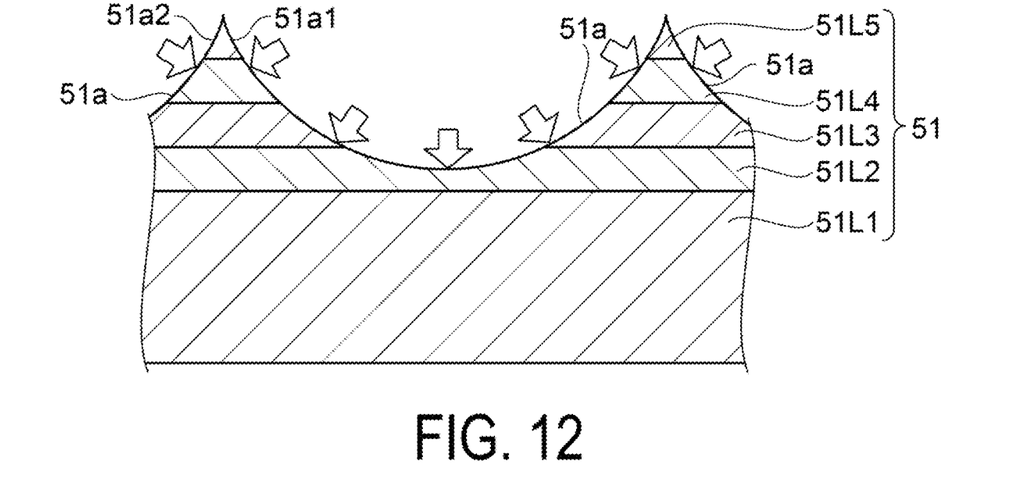
FIG. 12 is a cross-sectional view illustrating a part of the method for manufacturing the liquid crystal device.

At step S16, second etching processing is performed on the light-transmitting layer 51. Specifically, as illustrated in FIG. 12, for example, by performing wet etching (entire surface etch-back processing) using a fluorine-based etching solution, a portion in which the mask M has been formed, in other words, a straight line portion between the adjacent concave portions 51a can be removed (pillar removal). In addition, since the entire surface etch-back processing is performed, the depth of the concave portion 51a does not change. As a result, an edge 51a1 of the concave portion 51a and an edge 51a2 of the adjacent concave portion 51a can be linked.

By linking the edge 51a1 of the concave portion 51a and the edge 51a2 of the adjacent concave portion 51a in this manner, the concave portions 51a can be disposed without any gap therebetween, and light collection efficiency can be improved.

Figure 13:
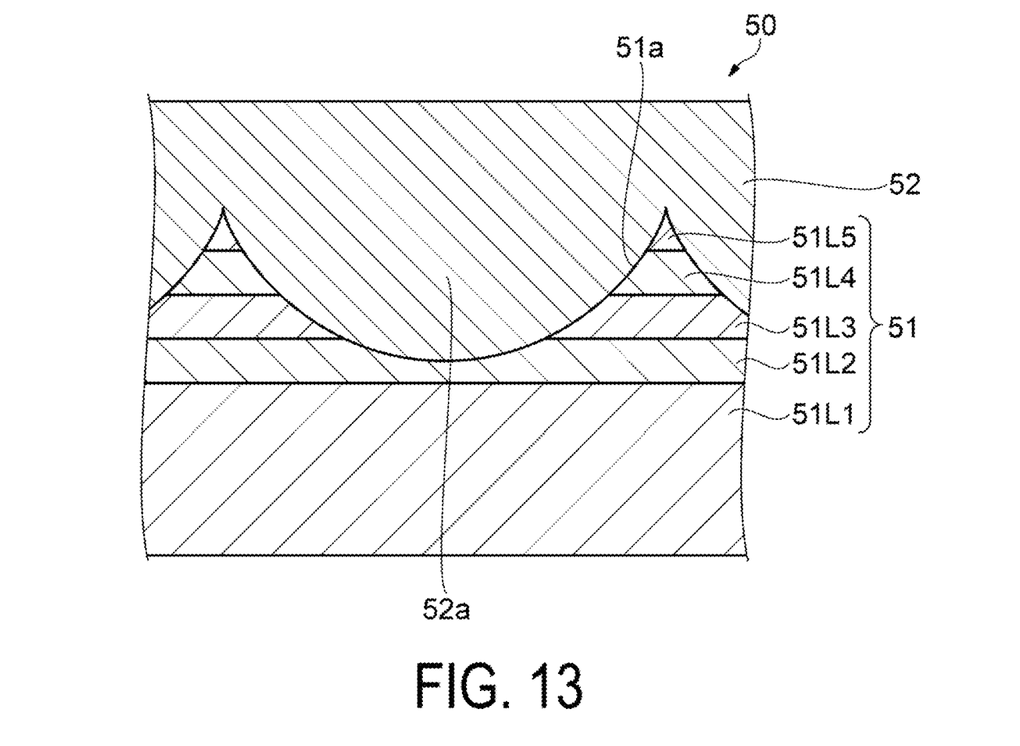
FIG. 13 is a cross-sectional view illustrating a part of the method for manufacturing the liquid crystal device.

At step S17, the lens layer 52 is formed. Specifically, as illustrated in FIG. 13, the lens layer 52 formed of silicon oxide or the like is formed on the light-transmitting layer 51. For example, a vapor deposition method such as the CVD method is used as a method for forming the lens layer 52. Further, as necessary, flattening processing using a chemical mechanical polishing (CMP) method or the like is performed on the lens layer 52. In the above-described manner, the lens body 50 as illustrated in FIG. 4 is completed.

At step S18, the pixel electrodes 27 are formed. Specifically, as illustrated in FIG. 4, the light-transmitting layer 44 formed of silicon oxide or the like is formed on the lens body 50. Thereafter, the pixel electrodes 27 formed of ITO or the like are formed on the light-transmitting layer 44. Subsequently, the first alignment film 28 is formed on the pixel electrodes 27 and the light-transmitting layer 44, using the oblique vapor deposition method or the like. In the above-described manner, the element substrate 10 is completed.

Figure 14:
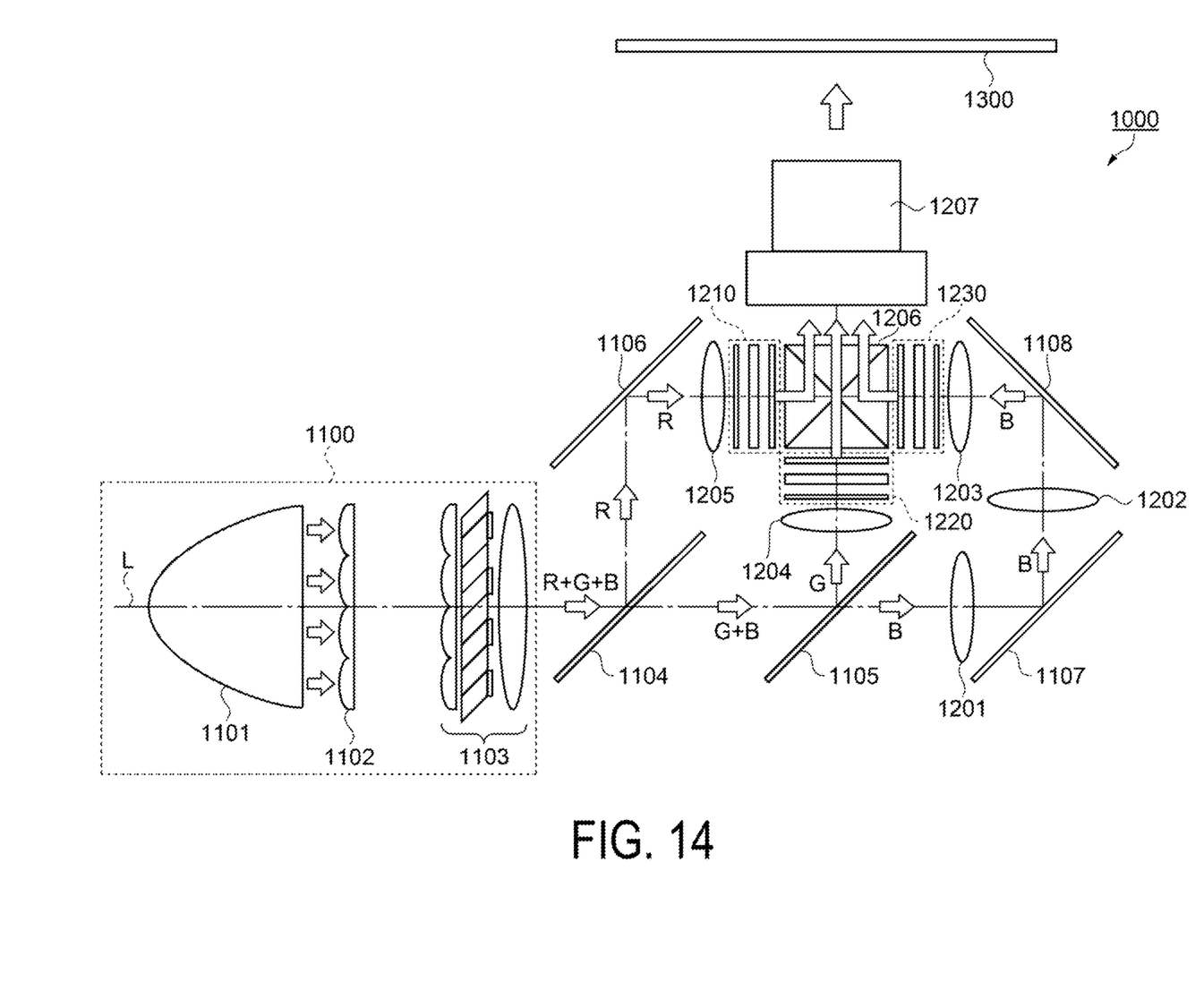
FIG. 14 is a schematic diagram illustrating a configuration of a projector as an electronic apparatus.

As illustrated in FIG. 14, the projector 1000 according to this embodiment includes a polarized light illumination device 1100 disposed along a system optical axis L, two dichroic mirrors 1104 and 1105 as light separation elements, three reflection mirrors 1106, 1107, and 1108, five relay lenses 1201, 1202, 1203, 1204, and 1205, three transmissive liquid crystal light valves 1210, 1220, and 1230 as optical modulation units, a cross dichroic prism 1206 as a photosynthesis element, and a projection lens 1207.

The polarized light illumination device 1100 generally includes a lamp unit 1101 as a light source including a white light source such as an ultra-high pressure mercury lamp or a halogen lamp, an integrator lens 1102, and a polarization conversion element 1103.

The dichroic mirror 1104 reflects red light (R) of a polarized light flux exiting from the polarized light illumination device 1100 and transmits green light (G) and blue light (B). The other dichroic mirror 1105 reflects the green light (G) transmitted through the dichroic mirror 1104 and transmits the blue light (B).

The red light (R) reflected by the dichroic mirror 1104 is reflected by the reflection mirror 1106 and is then incident on the liquid crystal light valve 1210 via the relay lens 1205. The green light (G) reflected by the dichroic mirror 1105 is incident on the liquid crystal light valve 1220 via the relay lens 1204. The blue light (B) transmitted through the dichroic mirror 1105 is incident on the liquid crystal light valve 1230 via a light guide system including the three relay lenses 1201, 1202, and 1203 and the two reflection mirrors 1107 and 1108.

The liquid crystal light valves 1210, 1220, and 1230 are each disposed facing an incident surface of each type of color light of the cross dichroic prism 1206. The color light incident on the liquid crystal light valves 1210, 1220, and 1230 is modulated based on video information (video signals) and exits toward the cross dichroic prism 1206.

This prism includes four rectangular prisms bonded together, and on inner surfaces of the prisms, a dielectric multilayer film that reflects the red light and a dielectric multilayer film that reflects the blue light are formed in a cross shape. The three types of color light are synthesized by these dielectric multilayer films, and light representing a color image is synthesized. The synthesized light is projected onto a screen 1300 by the projection lens 1207 as a projection optical system, and an image is enlarged to be displayed.

The liquid crystal light valve 1210 is a valve to which the above-described liquid crystal device 100 is applied. Note that the liquid crystal light valve 1210 is also applied to liquid crystal devices 200 and 300 to be described below. The liquid crystal device 100 is disposed between a pair of polarizing elements disposed in a crossed-Nicols state at an incident side and an exit side of the color light, with a gap interposed between the pair of polarizing elements. The same applies to the other liquid crystal light valves 1220 and 1230.

Note that electronic apparatuses on which the liquid crystal device 100 can be mounted include, in addition to the projector 1000, various electronic devices such as a head-up display (HUD), a head-mounted display (HMD), a smartphone, an electrical view finder (EVF), a mobile mini-projector, an electronic book, a mobile phone, a mobile computer, a digital camera, a digital video camera, a display, an on-board device, an audio device, an exposure device, and an illumination device.

As described above, the element substrate 10 includes the first substrate 10*a*, the light-transmitting layer 51 disposed on the first substrate 10*a*, the concave portions 51*a* provided in the light-transmitting layer 51, and the lens layer 52 disposed so as to fill the concave portions 51*a*. The light-transmitting layer 51 is constituted by the light-transmitting layers 51L1, 51L2, 51L3, 51L4, and 51L5, and the edge 51*a*1 of the concave portion 51*a* is in contact with the edge 51*a*2 of the adjacent concave portion 51*a*.

According to this configuration, since the concave portions 51*a* are formed in the light-transmitting 51 constituted by the plurality of light-transmitting layers 51L1, 51L2, 51L3, 51L4, and 51L5, the shape of the concave portion 51*a* can be adjusted by the plurality of light-transmitting layers 51L1 to 51L5 and can be formed into a desired shape. Thus, the light utilization efficiency can be improved. Further, since the edge 51*a*1 of the concave portion 51*a* and the edge 51*a*2 of the adjacent concave portion 51*a* are in contact with each other, in other words, there is no straight line remaining between the edge 51*a*1 of the concave portion 51*a* and the edge 51*a*2 of the adjacent concave portion 51*a* (a pillarless configuration), it is possible to collect the light L in a desired direction, and utilization efficiency of the light L can be increased.

Further, the light-transmitting layer 51 is constituted by the plurality of light-transmitting layers 51L1, 51L2, 51L3, 51L4, and 51L5 having the mutually different etching rates.

According to this configuration, since the concave portion 51*a* is formed in the plurality of light-transmitting layers 51L1, 51L2, 51L3, 51L4, and 51L5 having the mutually different etching rates, the shape of the concave portion 51*a* can be adjusted by the etching rates, and the utilization efficiency of the light L can be improved.

Further, the light-transmitting layer 51 is constituted by the plurality of light-transmitting layers 51L1, 51L2, 51L3, 51L4, and 51L5 having the mutually different oxygen contents.

According to this configuration, since the concave portion 51*a* is formed in the plurality of light-transmitting layers 51L1, 51L2, 51L3, 51L4, and 51L5 having the mutually different oxygen contents, the shape of the concave portion 51*a* can be adjusted by the oxygen content, and the utilization efficiency of the light L can be improved.

Further, the shape of the concave portion 51*a* is spherical.

According to this configuration, since the shape of the concave portion 51*a* is spherical, it is possible to collect the light L in the desired direction, and the utilization efficiency of the light L can be improved.

Further, the element substrate 10 includes the pixel electrodes 27 disposed on the first substrate 10*a*, and the wiring layer 41 disposed between the first substrate 10*a* and the pixel electrodes 27 and including the transistors 30, and the light-transmitting layer 51 and the lens layer 52 are disposed between the pixel electrodes 27 and the wiring layer 41.

According to this configuration, since the concave portion 51*a* is formed in the above-described light-transmitting layer 51, the shape of the concave portion 51*a* can be adjusted, and the utilization efficiency of the light L can be improved.

Further, the liquid crystal device 100 includes the above-described element substrate 10 as the optical substrate, the counter substrate 20 disposed so as to face the element substrate 10, and the liquid crystal layer 15 disposed between the element substrate 10 and the counter substrate 20.

According to this configuration, the liquid crystal device 100 capable of improving display quality can be provided.

Further, since the projector 1000 includes the liquid crystal device 100 described above, the projector 1000 capable of improving the display quality can be provided.

Further, the method for manufacturing the element substrate 10 includes forming, on the first substrate 10*a*, the plurality of light-transmitting layers 51L1, 51L2, 51L3, 51L4, and 51L5 having the mutually different etching rates, forming, on the light-transmitting layer 51, the mask M having the opening holes MO, forming the concave portions 51*a* by performing the first etching processing on the light-transmitting layer 51 using the mask M, removing the mask M on the light-transmitting layer 51, performing the second etching processing on the light-transmitting layer 51 so that the edge 51*a*1 of the concave portion 51*a* and the edge 51*a*2 of the adjacent concave portion 51*a* are in contact with each other, and forming the lens layer 52 so as to fill the concave portions 51*a*.

According to this configuration, since the concave portion 51*a* is formed in the light-transmitting layer 51 constituted by the plurality of layered films having the mutually different etching rates, the shape of the concave portion 51*a* can be adjusted by the etching rates and can be formed into a desired lens shape. Thus, the utilization efficiency of the light L can be improved. Further, since the second etching processing is performed so as to cause the edge 51*a*1 of the concave portion 51*a* to be in contact with the edge 51*a*2 of the adjacent concave portion 51*a*, the light L can be collected in the desired direction, and the utilization efficiency of the light L can be increased.

Second Embodiment

Figure 15:
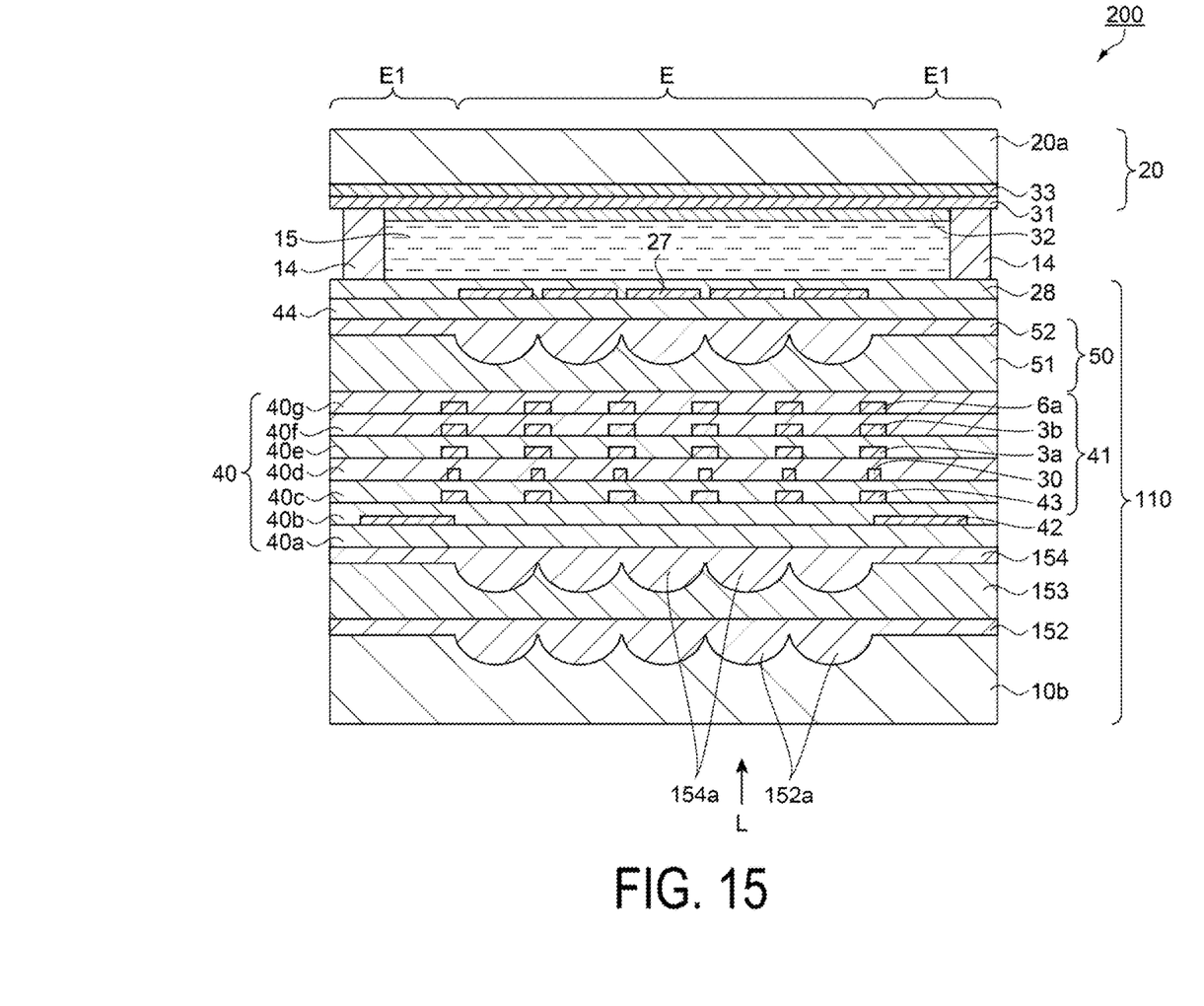
FIG. 15 is a cross-sectional view illustrating a structure of a liquid crystal device according to a second embodiment.

As illustrated in FIG. 15, the liquid crystal device 200 according to a second embodiment differs from the liquid crystal device 100 of the first embodiment in that the liquid crystal device 200 includes two lens layers 152 and 154 between the first substrate 10*a* and the wiring layer 41. The remaining configuration is generally the same. Thus, in the second embodiment, portions different from those of the first embodiment will be described in detail, and a description of other common portions will be omitted as appropriate.

In the liquid crystal device 200 according to the second embodiment, the second lens layer 152, a third light-transmitting layer 153, and the third lens layer 154 are disposed on a first substrate 10*b*. Note that a structure above the third lens layer 154 (on the liquid crystal layer 15 side) is the same as that of the first embodiment.

Concave portions are formed in the display region E of the first substrate 10*b*, and the second lens layer 152 is disposed so as to cover the concave portions. A lens 152*a* of the second lens layer 152 functions, for example, as the lens that adjusts the spread angle of the light L for each of the pixels P.

The second lens layer 152 is, for example, a material that has a greater refractive index than that of the first substrate 10b, and is formed, for example, of silicon oxynitride. The lens 152a in the second lens layer 152 is constituted by a convex lens that protrudes toward the first substrate 10b. Further, the lens 152a is formed in a hemispherical shape. Each of the lenses 152a of the second lens layer 152 is disposed so as to correspond to the lens 52a of the lens layer 52.

Concave portions are formed in the display region E of the third light-transmitting layer 153, and the third lens layer 154 is disposed so as to cover the concave portions. A lens 154a of the third lens layer 154 functions, for example, as the lens that adjusts the spread angle of the light L for each of the pixels P.

Further, the counter substrate 20 does not include a light-blocking film in the display region E. In other words, the counter substrate 20 does not include a black matrix that is a light-blocking film, at a position corresponding to a space between the pixel electrodes 27 of an element substrate 110 in plan view. Thus, when passing through the counter substrate 20, the light L exiting from the counter substrate 20 does not cause any disturbances in a polarization state as a result of a phase difference being generated due to diffraction by the black matrix. Therefore, a reduction in contrast can be suppressed. Further, when the counter substrate 20 and the element substrate 110 are combined, positions of the black matrix of the counter substrate 20 and a light-blocking body of the element substrate 110 are not misaligned, in other words, a so-called set misalignment does not occur. Thus, brightness does not decrease as a result of an opening ratio of the pixel P being reduced.

Third Embodiment

Figure 16:
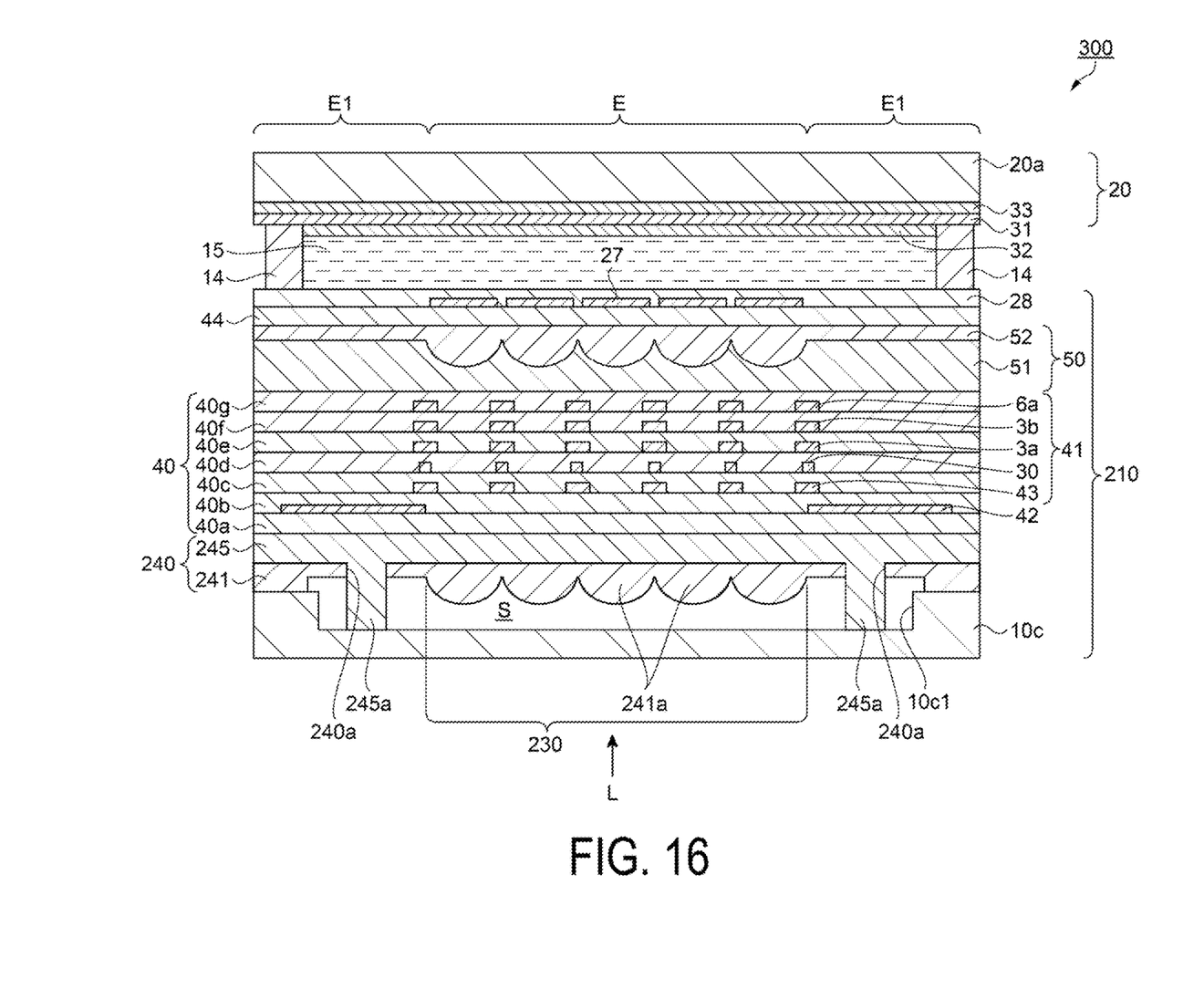
FIG. 16 is a cross-sectional view illustrating a structure of a liquid crystal device according to a third embodiment.

As illustrated in FIG. 16, the liquid crystal device 300 according to a third embodiment differs from the liquid crystal device 100 of the first embodiment in that the liquid crystal device 300 includes a lens body 240 including an air layer S between the first substrate 10a and the wiring layer 41. The remaining configuration is generally the same. Thus, in the third embodiment, portions different from those of the first embodiment will be described in detail, and a description of other common portions will be omitted as appropriate.

In the liquid crystal device 300 according to the third embodiment, the lens body 240 is disposed on a first substrate 10c, and similarly to the first embodiment, the insulating layer 40, the wiring layer 41, the lens body 50, the pixel electrodes 27, and the first alignment film 28 are formed above the lens body 240.

A concave portion 10c1 is provided in the first substrate 10c across the display region E and a portion of the peripheral region E1. The lens body 240 functions, for example, as the lens that adjusts the spread angle of the light L for each of the pixels P.

The lens body 240 includes the air layer S interposed between the lens body 240 and the first substrate 10c, a lens layer 241 including a lens assembly 230 including a plurality of lenses 241a, and a light-transmitting layer 245. The light-transmitting layer 245 adjusts the optical path length of the light L that passes through the lens 241a. The light-transmitting layer 245 is formed of silicon oxide, for example.

The lens 241a is constituted by a convex lens protruding toward the air layer S and having a convex curved surface. The lens 241a is hemispherical. The lens 241a is formed of silicon oxide or silicon oxynitride, for example. The refractive index of silicon oxide is 1.61, for example. The refractive index of silicon oxynitride is 1.46, for example. The refractive index of the air layer S is 1.0, for example.

By disposing the air layer S and the lenses 241a from the first substrate 10c side in this manner, the light L entering from the first substrate 10c side is refracted from the air layer S toward the lens 241a. Thus, the light L can be efficiently refracted, and the utilization efficiency of the light can be improved.

Through holes 240a that are communicated with the air layer S are provided in the lens layer 241. The through hole 240a is blocked by a portion of the light-transmitting layer 245 disposed on the lens layer 241.

Specifically, the light-transmitting layer 245 includes connecting portions 245a that are connected to the concave portion 10c1 of the first substrate 10c through the through holes 240a. As a result of providing the connecting portions 245a, a state of the air layer S between the first substrate 10c and the lens layer 241 can be maintained.

The air layer S is formed by a gas such as air. Note that the air layer S may be formed by a vacuum. Further, the air layer S may be an air-tight space or may not be an air-tight space.

As a result of the air layer S being provided between the lens layer 241 and the first substrate 10c, the lens assembly 230 of the lens layer 241 is disposed so as to be separated from a bottom surface of the concave portion 10c1 of the first substrate 10c. A portion of the lens layer 241 located outside the lens assembly 230 in plan view is in contact with the first substrate 10c.

Note that, as in the embodiments described above, the configuration of each of the element substrates 10, 110, and 210 is described as the optical substrate, but the configuration is not limited to this configuration, and a configuration in which only the light-transmitting layer 51 and the lens layer 52 are disposed on the first substrate 10a may be employed as the optical substrate.

Further, a method for manufacturing the lens 52a of the liquid crystal device 100 according to the first embodiment may be applied to the lens 152a and the lens 154a provided in the liquid crystal device 200 according to the second embodiment.

Further, the lens 52a according to the first embodiment, the second embodiment, and the third embodiment is not limited to being the convex lens having the convex curved surface, but may be a concave lens having a concave curved surface.

Further, the lenses 152a, 154a, and 241a described in the second embodiment and the third embodiment are not limited to being the convex lenses each having the convex curved surface, but may be concave lenses each having a concave curved surface, or may be a combination of the convex lenses and the concave lenses.

The lens body 50 including the light-transmitting layer 51 and the lens layer 52 described in the embodiments above is not limited to being disposed in the element substrate 10, but may be disposed in the counter substrate 20. Further, the lens body 50 may be disposed in both the element substrate 10 and the counter substrate 20.

Further, the above-described liquid crystal device 100 is not limited to being applied as the electro-optical device, but may be applied to an organic EL device, a plasma display, an electronic paper (EPD), or the like, for example.

What is claimed is:

1. An optical substrate comprising:
a substrate;
a light-transmitting layer disposed at the substrate;
a concave portion provided at the light-transmitting layer; and
a lens layer disposed filling the concave portion, wherein
the light-transmitting layer is constituted by a plurality of layered films including a first layered film, a second layered film and a third layered film,
the concave portion is formed by the plurality of layered films,
the concave portion is provided across the second layered film and the third layered film without being provided across the first layered film,
the first layered film is formed outside a forming region of the concave portion, and
an edge of the concave portion is in contact with an edge of an adjacent concave portion adjacent to the concave portion.

2. The optical substrate according to claim 1, wherein the light-transmitting layer is constituted by the plurality of layered films having mutually different etching rates.

3. The optical substrate according to claim 1, wherein the light-transmitting layer is constituted by the plurality of layered films having mutually different oxygen contents.

4. The optical substrate according to claim 1, wherein a shape of the concave portion is spherical.

5. The optical substrate according to claim 1, comprising:
a pixel electrode disposed at the substrate; and
a wiring layer disposed between the substrate and the pixel electrode and including a transistor, wherein
the light-transmitting layer and the lens layer are disposed between the pixel electrode and the wiring layer.

6. An electro-optical device comprising:
the optical substrate according to claim 1;
a counter substrate disposed facing the optical substrate; and
an electro-optical layer disposed between the optical substrate and the counter substrate.

7. An electronic apparatus comprising:
the electro-optical device according to claim 6.

8. The optical substrate according to claim 1, wherein
each of the plurality of layered films is a flat film, and
the concave portion penetrates each of the plurality of layered films.

9. An optical substrate comprising:
a substrate;
a light-transmitting layer disposed at the substrate, the light-transmitting layer being constituted by a plurality of layered films including a first layered film, a second layered film and a third layered film, each of the layered films being light-transmitting;
a concave portion provided at the light-transmitting layer; and
a lens layer disposed filling the concave portion, wherein
the concave portion is provided across the second layered film and the third layered film without being provided across the first layered film,
the first layered film is formed outside a forming region of the concave portion,
the light-transmitting layer has an etching rate varying in a continuous manner, and
an edge of the concave portion is in contact with an edge of an adjacent concave portion adjacent to the concave portion.

10. An optical substrate comprising:
a substrate;
a light-transmitting layer disposed at the substrate, the light-transmitting layer being constituted by a plurality of layered films including a first layered film, a second layered film and a third layered film, the layered films having different oxygen contents;
a concave portion provided in the light-transmitting layer; and
a lens layer disposed filling the concave portion, wherein
the concave portion is provided across the second layered film and the third layered film without being provided across the first layered film,
the first layered film is formed outside a forming region of the concave portion,
the light-transmitting layer has an oxygen content varying in a continuous manner, and
an edge of the concave portion is in contact with an edge of an adjacent concave portion adjacent to the concave portion.

* * * * *